Nov. 2, 1965  M. DYRE  3,215,872
ELECTROMAGNETIC INTERMITTENT ROTARY DRIVE
Filed April 29, 1963  2 Sheets-Sheet 1

Nov. 2, 1965 M. DYRE 3,215,872
ELECTROMAGNETIC INTERMITTENT ROTARY DRIVE
Filed April 29, 1963 2 Sheets-Sheet 2
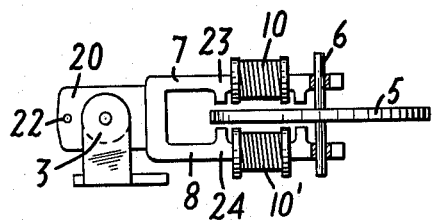
FIG. 6
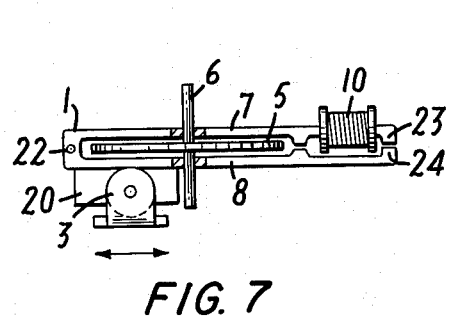
FIG. 7
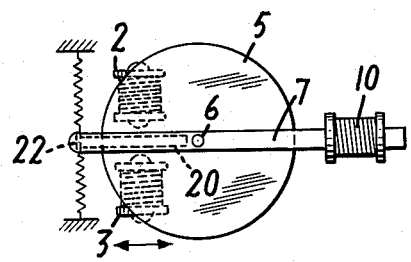
FIG. 7A
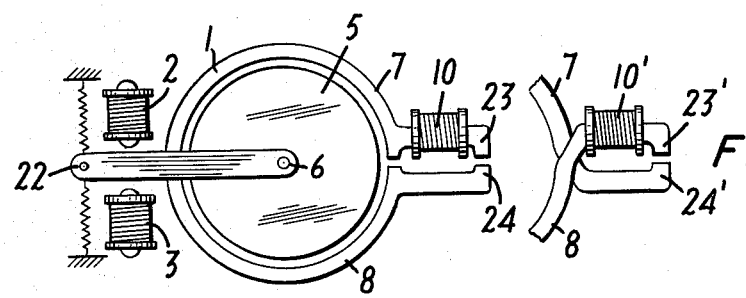
FIG. 8
FIG. 9
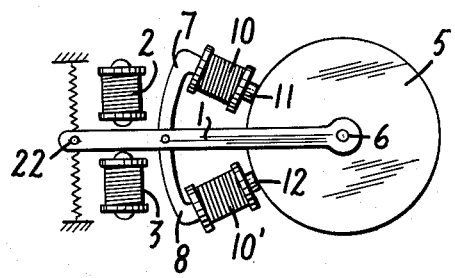
FIG. 10

United States Patent Office
3,215,872
Patented Nov. 2, 1965

3,215,872
ELECTROMAGNETIC INTERMITTENT ROTARY DRIVE
Mogens Dyre, Gildbro, Nordborg, Denmark, assignor to Danfoss A/S, Nordborg, Denmark, a company of Denmark
Filed Apr. 29, 1963, Ser. No. 276,316
Claims priority, application Germany, Apr. 27, 1962, D 38,777
13 Claims. (Cl. 310—20)

This invention relates to electric motors and more particularly to oscillatory armature motors.

Oscillatory armature motors are known. In oscillatory motors the oscillatory armature imparts torque to a rotary element. The armatures can be activated by coils energized by pulsating direct current, however, it is common to energize the coils with alternating current so that the armature will oscillate twice the frequency of the applied alternating current. In one construction of such motors a driving armature engages a rotatably mounted disk or driven element in an inclined position to that upon retraction of the armature, it is immediately disengaged from the driven disk or elements. This type of construction has a serious limitation in it in that during forward travel of the armature a considerable portion of its stroke or movement is not utilized in imparting driving energy to the driven element. Another limitation of this type of motor is the fact that friction between the driving armature and disk is very small so that large driving forces cannot be applied to the disk and the motor is able to transmit very little torque.

In another type of oscillatory armature motor the magnetic path of the flux in the motor energizing coil is a magnetic circuit comprising the oscillatory armature and the driven disk which accordingly must necessarily be made of a magnetizable material. The arrangement in such devices is very complicated and frictional contact is made between two materials which are magnetized. The armature and driven disk make frictional contact at only one single position on the driven disk so that the frictional area is subjected to considerable amount of wear.

A principal object of the present invention is to provide a simple construction for an oscillatory armature motor capable of transmitting a large force or torque between an oscillatory armature and a driven rotary disk without having to have the driven element made of magnetizable material and capable of transmitting a large torque.

A feature of the invention is the provision of an oscillatory armature having two arms which are disposed on opposite sides of a driven rotary element. The driven element extends inwardly between the two arms. The two arms form a magnetic circuit with an air space between them in which the rotatable element is disposed. The armature arms are resilient so that when the armature is in a state of energization the arms are attracted toward each other and grip the rotatable element between them for imparting rotary motion thereto as the armature is oscillated in synchronism with the application of the magnetization energy.

The energizing coils of the armature are energized in both senses of polarity when alternating current is applied thereto so that the gripping action between the armature arms and the element takes place at a frequency which is twice the frequency of the applied alternating current.

The motor according to the invention is provided with coils for oscillating the oscillatory armature from a rest position alternatively to two oscillated positions spaced from said rest position on opposite sides thereof, at the same frequency and at the same time that the armature exciting coil is being energized.

According to the invention the driven element need not be made of a magnetizable material and the new and improved oscillatory armature motor can develop greater torques than heretofore were transmissible.

The oscillatory armature motor according to the invention is usable for many applications, for example, as a servomotor for valve adjustments, a regulatory motor for varying resistance in a variable resistor or in conjunction with transformers or as a programmer motor and is usable on washing machines for driving the agitator thereon.

Another feature of the invention is the fact that it operates at very low r.p.m.'s without the need of a gear transmission or any transmission means and can attain full rotational speed within ten milliseconds from a standstill to operational speed.

The motor is rotational in two opposite directions and can be easily reversed and the speed is easily controlled electrically by controlling the frequency of the energizing current for oscillating the armature and the exciting current for activating the arms of the armature.

Other features and advantages of the oscillatory armature motor in accordance with the present invention will be better understood and described in the following specification and appended claims, in conjunction with the following drawings in which:

FIG. 6 is a side elevation view of still another motor according to the invention;

FIG. 7 is a side view of another embodiment of the invention;

FIG. 7a is a plan view of the embodiment in FIG. 7;

FIG. 8 is a plan view of a motor according to the invention illustrative of an oscillatory armature operating on the entire circumference of a driven disk element;

FIG. 9 is a fragmentary view of a variation of the motor according to FIG. 8; and FIG. 10 is a plan view of another motor according to the invention illustrative of the frictional application of the oscillatory armature arms to the circumference of the driven element or disk of the motor.

Figure 1:
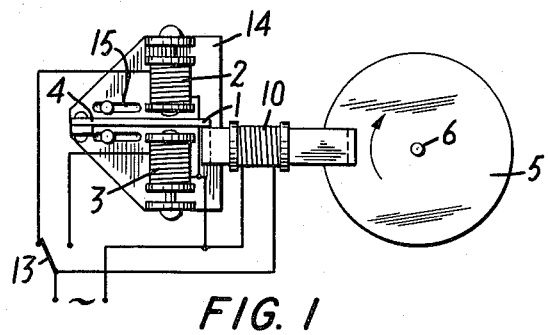
FIG. 1 is a plan view of an oscillatory armature motor according to the invention.
Figure 2:
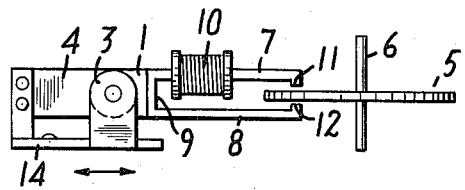
FIG. 2 is a side elevation view of the motor illustrated in FIG. 1.

According to the oscillatory armature motor in FIGS. 1 and 2 an armature 1 is mounted oscillatable from a rest position illustrated in FIGS. 1 and 2 to two oscillated positions, spaced therefrom, alternatively. The armature 1 is oscillated by energizing a first motor electromagnetic coil 2 or a second electromagnetic motor coil 3.

The armature 1 comprises a fixed, oscillatable rear portion 4 and a front portion which is free to oscillate and bifurcated in order to drive a rotatably mounted disk or driven element 5 rotatable on a pivotal axis 6. The bifurcated portion of the armature comprises two resilient arms 7, 8 which are connected together by a cross-piece 9 forming a magnetic circuit therewith and having an air space between two clamping face areas 11, 12 between which is mounted the disk 5 extending radially inwardly between the two arms 7, 8 as illustrated.

The oscillatory motor according to the invention has an exciting coil 10 wound on a coil form disposed on the arm 7 for exciting the armature arms and developing flux through the above-described magnetic circuit. When the coil 10 is energized flux is developed in the magnetic circuit and the two arms 7, 8 are attracted toward each other thereby clamp the pulley 5 between them with a force in dependence upon the energization of the coil, both as to the intensity of energization and to the frequency of energization thereof. The exciting coil controls the frictional force developed between the faces 11, 12 and the side surfaces or major surfaces of the disk 5 and the timing of engagement. The coil 10 is connected to an alternating current source, as shown, in parallel with the motor coils 2, 3 so that the alternations of the alternating current occur at the same time in the individual motor coils 2, 3 being energized alternatively simultaneously with the exciting coil 10 so that clamping action takes place when the armature is oscillated to one of its oscillated positions alternatively by coils 2 or 3.

For example, when the coil 2 is energized by positioning a switch 13 in the position illustrated in FIG. 1 the armature is attracted by the coil 2 so that the disk 5 is rotated in a clockwise direction. When the switch 13 is positioned to the right, the contacts for energizing the coil 3 are closed and the motor is reversibly driven. The oscillatory armature is restored automatically to its rest position when the alternating current passes through zero at which time the frictional contact between the armature and driven disk 4 is ineffective.

The oscillatory armature is mounted on a base 14 and is movable axially by moving the baseplate 14 on elongated slots 15 so that the radial distance of the area in which the faces 11, 12 engage the side surfaces of the disk 5 can be varied thereby to vary the revolutions per minute of the motor.

In the construction illustrated in FIGS. 1 and 2 the faces 11, 12 define an air gap between themselves and the major faces of the disk 5 are disposed therebetween. The disk 5 may be made of magnetizable material if desired, for example, it can be made of iron in order that the air space may be kept large. However, the disk 5 need not be magnetizable. The motor can be constructed as illustrated in various figures of the drawing in which the same reference numerals are employed with respect to similar parts in the embodiment illustrated in FIG. 1.

Figure 3:
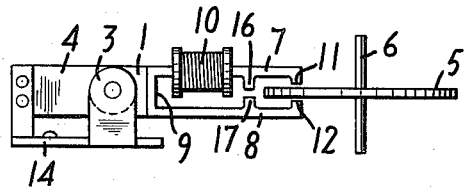
FIG. 3 is a side elevation view of a second embodiment of a motor according to the invention.

In an embodiment illustrated in FIG. 3 of the invention the arms 7, 8 are provided with projections 16, 17 between which the controlling air space of the magnetic circuit is formed. The space between the projections 16 and 17 is smaller than the space formed between the faces 11 and 12. The magnetic circuit is completed principally through the inner portions of arms 7, 8, the joining portion 9 and through the projections 16, 17 so that the outer end portions of the arms 7, 8 having the clamping surfaces 11, 12 do not have to be made of magnetizable material nor does the disk 5 have to be made of a magnetizable material.

Figure 4:
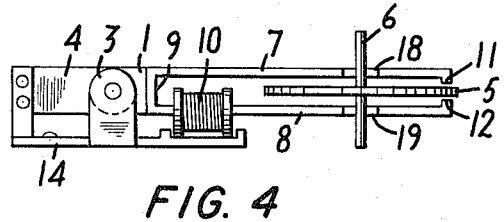
FIG. 4 is a side elevation view of a third embodiment of a motor according to the invention.

A different embodiment of a motor according to the invention is illustrated in FIG. 4 in which the armature arms 7, 8 are constructed longer than heretofore described and are provided with openings 18, 19 through which the pivotal shaft 6 of the disk 5 extends so that the disk is mounted substantially in its entirety between the two arms and the clamping surfaces 11, 12 are capable of clamping in a circular or annular area on the disk 5 outwardly of pivotal shaft 6 and which is substantially of the same radial length as the arms. This makes driving of the disk easier. In this construction the magnetizing coil 10 is mounted on the base plate 14 and has a sufficiently large opening in the form on which the coil is wound so that the arms move relative to each other and the coil 10 need not be oscillated by the oscillatory armature.

Figure 5:
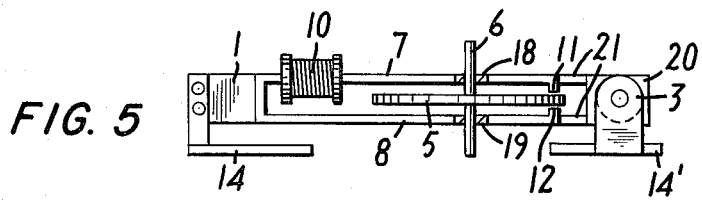
FIG. 5 is a side elevation view of another motor according to the invention.

In the illustration of another embodiment of an oscillatory motor according to the invention illustrated in FIG. 5, the motor coils 2, 3 are arranged at the free end of the oscillatory armature whereby driving forces of larger amplitude can be transmitted to the driven disk 5.

The disk is mounted, in the embodiment in FIG. 5, between the arms 7, 8 in the manner illustrated in FIG. 4 and the magnetizing coil 10 is mounted on arm 7 and is assisted by a magnetic flux leakage preventer by the use of a non-magnetizable plate 20 which drives the oscillatory armature 1. The plate 20 is operably connected to the free ends of the arms 7, 8 by strips 21 made of resilient, non-magnetizable material. The motor in this embodiment comprises a second baseplate 14′ on which the plate 20 and its resilient strips 21 are oscillated by motor coils 2, 3. The strips 21 permit movement of the arms 7, 8 toward each other when the exciting coil 10 is energized.

In the construction illustrated in FIG. 6, the armature arms 7, 8 are provided with a second set of inwardly extending projections 23, 24 and the disk extends radially inwardly between two sets of projections defining contacting or clamping surfaces. The shaft 6 is disposed outwardly of the two sets of clamping surfaces and two exciting coils 10, 10′ disposed on respective arms 7, 8 illustrated as being disposed between the two sets of clamping surfaces. The two exciting coils are connected in parallel with the motor coils 2, 3. The shaft 6 extends through apertures in the aperture arms 7, 8.

In this embodiment the motor armature is pivoted and the motor is provided with springs, not shown, connected to the armature adjacent a pivot 22 to restore the armature automatically to its center or rest position.

In the last-described embodiment four clamping areas or surfaces are provided. In order to grip the disk 5 along the full length of the major surfaces thereof of the motor according to the invention is constructed as illustrated in FIGS. 7 and 7a in which the disk is mounted for rotation between the rear portions of the arms 7, 8 and the exciting coil 10 is mounted at the outer end of the arm 7 with two sets of projections 23, 24 and those intermediate coil 10 and shaft 6 defining a magnetic circuit so that a short magnetic circuit is provided at the outer free end portions of the arms. When the coil 10 is energized the arms 7, 8 are attracted toward each other and bear substantially along the complete radial length of the disk 5 and forcibly grip it along substantially the length of the arms 7, 8 or at least along the length of the rear portions of the two arms.

A plate 20 is provided on which the armature 1 is mounted and the motor coils 2, 3 oscillate it relative to the plane of the disk 5. Moreover, the plate 20 is movable axially in order to variably change the speed of the motor by changing its position relative to the motor coils relative a free end thereof so its flexure characteristics are varied. The armature is restored by springs, not shown, to its rest position on pivot 22 in the manner later described as to other embodiments.

Another construction possible of an oscillatory motor according to the invention in which large surfaces are clamped is illustrated in FIG. 8 in which the arms 7, 8 have arcuate portions disposed circumferentially of the periphery of the disk 5, whether disk 5 is made magnetizable or not, spaced outwardly thereof so that when exciting coil 10 is energized the two arcuate portions of two arms grip the outer periphery of the disk 5. The arms comprise two outer portions or extensions forming the magnetic circuit with two air gaps formed therein. One gap is defined by projections 23, 24 and an inner gap is formed at an opposite end of coil 10. The armature 1 is pivotally mounted at 22 and is oscillated by two motor coils 2, 3 in synchronism with the exciting of the coil 10. The motor armature is restored to a rest position by springs connected thereto adjacent the pivot 22 as illustrated when the motor coils and exciting coil are deenergized.

In the embodiment illustrated in FIG. 9 the motor is constructed somewhat similar to the construction illustrated in FIG. 8 except that the outer portions of the arms 7, 8 are offset so projections 23, 24′ are in the same plane as in the embodiment of FIG. 8. The disk 5 is released in this construction by energizing the coil 10'. In this construction the disk 5 is rotated during the reverse movement of the oscillatory armature, that is to say, during the restoration period thereof. This arrangement is usual when the disk 5 has to be secured against rotation during a standstill of the armature while the armature is in its rest position. The disk 5 is clamped in a deenergized condition of the exciting coil 10.

In the construction illustrated in FIG. 10, the disk 5 is rotatably driven by actuatably and self-restoring arms 7, 8 which comprise resilient arms of the armature 1. The arms are each provided with an energizing coil 10, 10' respectively which, when energized, causes the contact or frictional surfaces 11, 12 to engage the outer periphery of the disk 5 and rotate it as the armature 1 is oscillated alternatively by the energizing motor coils 2, 3 as heretofore described. The armature 1 is returned to a central or rest position by springs connected adjacent pivot 22 as illustrated, when the motor coils are deenergized. The two arms disengage themselves from the disk 5 when the exciting coils 10, 10' are deenergized at the time the motor coils are deenergized.

Further modifications or variations can be accomplished without changing the principles of the present invention, for example, the frictional surfaces 11, 12 can be coated with material which will increase the frictional contact. Moreover, the surfaces, engaged by these frictional contact surfaces, on the disk 5 can be similarly covered or coated with a material that will increase the coefficient or friction. The number of clamping portions or areas can be varied or adapted to conditions at hand. Moreover, instead of rotational movement of the driven element, axial movement can be imparted to a movable element, for example, an elongated member movable axially or longitudinally.

Those skilled in the art will understand that in the various embodiments illustrated and described the motor coils and exciting coil or coils are connected for energization in timed relationship so that the gripping of the driven element is in timed relationship with the application of oscillations in one direction or another of the armature to impart rotation to the driven element or transmissible torque.

While preferred embodiments of the invention have been shown and described, it will be understood that many modifications and changes can be made within the true spirit and scope of the invention.

What I claim and desire to secure by Letters Patent is:

1. In an oscillatory armature motor, in combination, an oscillatory armature mounted oscillatable alternatively from a rest position to two oscillated positions spaced from and on opposite sides of said rest position, a movably mounted element driven by said armature when oscillated to either of said oscillated positions, said armature having two resilient arms oscillatable toward said driven element in timed relationship with said oscillations of said armature to said oscillated positions, for frictionally engaging said driven element and moving it in a direction in which said armature is oscillated, means to synchronize the oscillations of said armature to either of said two oscillated positions and the frictional contact of said arms with said driven element during oscillation of said armature toward said positions thereby to drive said driven element in a given direction.

2. In an oscillatory armature motor, in combination, an oscillatory armature mounted oscillatable alternatively from a rest position to two oscillated positions spaced from and on opposite sides of said rest position, a rotatably mounted element driven rotationally by said armature when oscillated to either of said oscillated positions, said armature having two resilient arms oscillatable toward said driven element in timed relationship with said oscillations of said armature to said oscillated positions for at least frictionally engaging said element and moving it rotationally in a direction in which said armature is oscillated, means to synchronize the oscillations of said armature to either of said two oscillated positions and the frictional contact of said arms with said driven element during oscillation of said armature toward said positions thereby to rotate said driven element in a given direction.

3. In an oscillatory armature motor, in combination, an oscillatory armature mounted oscillatable alternatively from a rest position to two oscillated positions spaced from and on opposite sides of said rest position, a rotatably mounted element driven rotationally by said armature when oscillated to either of said oscillated positions, said armature having two resilient arms oscillatable toward said driven element in timed relationship with said oscillations of said armature to said oscillated positions for releasably gripping said element and moving it rotationally in a direction in which said armature is oscillated, means to synchronize the oscillations of said armature alternatively to either of said two oscillated positions and the gripping of said element by said arms during oscillation of said armature toward said positions thereby to rotate said driven element in a given direction.

4. In an oscillatory armature motor, in combination, an oscillatory armature mounted oscillatable alternatively from a rest position to two oscillated positions spaced from and on opposite sides of said rest position, a rotatably mounted element driven rotationally by said armature when oscillated to either of said oscillated positions, said armature having two resilient arms oscillatable toward said driven element in timed relationship with said oscillations of said armature to said oscillated positions for at least frictionally engaging it and moving it rotationally in a direction in which said armature is oscillated, means comprising at least one motor coil and an exciting coil to synchronize the oscillations of said armature to either of said two oscillated positions and the frictional contact of said arms with said driven element during oscillation of said armature toward said positions thereby to rotate said driven element in a given direction.

5. In an oscillatory armature motor according to claim 4, in which said arms comprise a magnetic circuit having at least one air gap.

6. In an oscillatory armature motor according to claim 5, in which said exciting coil is mounted on one of said arms.

7. In an oscillatory armature motor according to claim 5, in which said exciting coil is mounted stationary and said armature and arms oscillate freely with respect to said exciting coil.

8. In an oscillatory armature motor according to claim 4, in which said arms are elastic and disposed for movement toward each other and restorable to an initial rest position.

9. In an oscillatory armature motor according to claim 8, in which said element is a disk having major side surfaces and said arms engage the major side surfaces of said driven disk for driving it.

10. In an oscillatory armature motor according to claim 8, in which said driven element comprises a rotary disk and in which said arms engage said disk peripherally on its outer periphery.

11. In an oscillatory armature motor according to claim 10, in which said arms engage substantially all the periphery of said rotary disk.

12. In an oscillatory armature motor according to claim 4, in which said arms define a magnetic circuit having an air gap, and in which said rotary element is disposed in said air gap.

13. In an oscillatory armature motor, in combination, an oscillatory armature mounted oscillatable alternatively from a rest position to two oscillated positions spaced from and on opposite sides of said rest position, a rotatably mounted disk driven rotationally by said armature when oscillated to either of said oscillated positions, said armature having two resilient arms oscillatable toward said driven disk in timed relationship with said oscillations of said armature to said oscillated positions for at least frictionally engaging said disk and moving it rotationally in a direction in which said armature is oscillated, means to synchronize the oscillations of said armature to either of said two oscillated positions and the frictional contact of said arms with said driven disk during oscillation of said armature toward said positions thereby to rotate said driven element in a given direction, and means to variably control the direction of oscillation of said disk alternatively to either of said oscillated positions.

References Cited by the Examiner
UNITED STATES PATENTS

| | | | |
|---|---|---|---|
| 1,615,604 | 1/28 | Wahl | 310—20 X |
| 2,353,335 | 7/44 | Heintz et al. | 318—37 |
| 2,432,140 | 12/47 | Dehmel | 318—37 |

ORIS L. RADER, *Primary Examiner.*

MILTON O. HIRSHFIELD, JOHN F. COUCH,
*Examiners.*